United States Patent [19]

Babbel et al.

[11] Patent Number: 4,521,870
[45] Date of Patent: Jun. 4, 1985

[54] AUDIO/VIDEO SYSTEM HAVING TOUCH RESPONSIVE FUNCTION DISPLAY SCREEN

[75] Inventors: John H. Babbel, Mountain View; William A. Russell, Atherton; Robert B. Steele, Fremont, all of Calif.

[73] Assignee: Ampex Corporation, Redwood City, Calif.

[21] Appl. No.: 662,529

[22] Filed: Oct. 18, 1984

Related U.S. Application Data

[63] Continuation of Ser. No. 509,097, Jun. 28, 1983, abandoned, which is a continuation of Ser. No. 252,571, Apr. 9, 1981, abandoned.

[51] Int. Cl.³ .............................................. G06F 1/00
[52] U.S. Cl. .................................................... 364/900
[58] Field of Search ................. 364/200, 900, 13, 48, 364/402; 340/706, 712, 714, 722, 723

[56] References Cited

U.S. PATENT DOCUMENTS

| | | | |
|---|---|---|---|
| 3,653,001 | 3/1972 | Ninke | 364/200 |
| 4,041,467 | 8/1977 | Cota et al. | 364/900 |
| 4,057,849 | 11/1977 | Ying et al. | 364/200 |
| 4,100,607 | 7/1978 | Skinner | 364/900 |
| 4,110,823 | 8/1978 | Cronshaw et al. | 364/200 |
| 4,150,429 | 4/1979 | Ying | 364/200 |
| 4,162,520 | 7/1979 | Cook et al. | 364/200 |
| 4,305,071 | 12/1981 | Bell et al. | 340/712 |
| 4,310,839 | 1/1982 | Schwerdt | 340/712 |
| 4,413,277 | 11/1983 | Murray | 364/402 |
| 4,413,314 | 11/1983 | Slater et al. | 340/706 |

Primary Examiner—Gareth D. Shaw
Assistant Examiner—Tim A. Wiens
Attorney, Agent, or Firm—George B. Almeida; Joel D. Talcott

[57] ABSTRACT

An audio/video editing system presents different menus of editing functions on a display screen and changes the menus as well as performing different editing functions in response to the touching of selected areas of the display screen by an operator. An arrangement of light emitting diodes and photodetectors provides a network of beams across the face of the display screen. Selected beams are interrupted when the operator points his finger at particular characters being displayed on the screen. The display menus and editing functions are controlled by an edit controller which includes a central processing unit having a memory loaded with data from a computer file system, a character generator for providing the various menus on the display screen and a plurality of intelligent line controllers coupled to a plurality of source tape recorders, a record tape recorder and a switcher capable of coupling a different one of the source recorders to the record recorder. Each intelligent line controller which includes its own processing unit and memory controls the flow of data between the central processing unit and the various recorders and the switcher in addition to converting the data between parallel and serial forms. A separate interface coupled between each of the intelligent line controllers and an associated one of the recorders or the switcher includes processors which convert the data into a form usable by the recorder or switcher.

12 Claims, 10 Drawing Figures

AUDIO/VIDEO SYSTEM HAVING TOUCH RESPONSIVE FUNCTION DISPLAY SCREEN

This application is a continuation of application Ser. No. 509,097, filed June 28, 1983 (abandoned), which is a continuation of application Ser. No. 252,571, filed Apr. 9, 1981 (also abandoned).

BACKGROUND OF THE INVENTION

Over the years audio/video editing systems have developed into complex and sophisticated arrangements for manipulating video and audio information recorded therewith in a desired fashion. In a typical editing system selected video or audio information from a plurality of different inputs is recorded on a record audio/video tape recorder under the careful control of an operator. The information to be recorded is typically contained in one or more of a plurality of source tape recorders but can also come from other input sources such as a microphone or video camera. A switcher coupled between the record tape recorder and the source tape recorders and any other input devices responds to editing commands to control the exact information recorded by the record tape recorder. Proper synchronization during the recording operation characterizing a typical editing process is maintained by reference to a coded reference track which accompanies each recording on tape and which identifies each frame of the recording. Such reference tracks typically involve the use of time code (recorded either directly on the reference track within the video tracks during the vertical interval, or a combination of both) as specified in various documents by the Society Of Motion Picture And Television Engineers (SMPTE) and the European Broadcasting Union (EBU).

In a typical editing operation the operator manipulates a keyboard while viewing a video monitor which provides a visual display of the video information being recorded on the record tape recorder. The keyboard is typically a designated keyboard, meaning that it is comprised of different keys representing specific editing functions. The keys may be arranged in an ASCII format or in any other format which is convenient. Keys arranged in the ASCII format are also designated by letters arranged in a conventional typewriter keyboard format so that the various different editing functions can be selected largely by feel and based on experience and memory, much in the same manner as an experienced typist types.

As editing systems have become more sophisticated and complex, the keyboards used therewith have grown larger and more confusing. It is not unusual, for example, to have an editing keyboard comprised of more than 100 keys, each representing a different editing function or type of function. As a result considerable time and experience are required with a given machine before the operator can perform editing functions quickly and efficiently. However, even in cases where the operator is experienced and totally familiar with a given editing system, there is an inherent problem with conventional editing systems in that the mechanical considerations imposed by a fixed keyboard with so many functions seriously detract from the creative aspects of editing. Time code representations of edit entry and exit points are typically relied upon rather than editing in accordance with the picture itself.

A further limitation of many conventional editing systems resides in the confinement of system intelligence to one central location. Those systems employing a central processor or other processing unit in conjunction with the editing functions typically concentrate limited processing equipment at one central location, thereby restricting future flexibility of a particular system.

Over the years various attempts have been made at improving the human-machine interface involved in editing. One such approach, for example, involves the use of a light pen. The pen is manipulated relative to a responding member to select certain editing functions, thereby reducing the number of buttons needed. At best, however, such systems replace keyboard buttons with the light pen, requiring that the operator pick up and handle the light pen with each operation.

Accordingly, it would be desirable to provide an editing system with improved human-machine interfacing so as to facilitate the artistic aspects and approach to video editing.

It would furthermore be desirable to provide an editing system capable of displaying different menus of editing functions to be chosen from by the operator.

It would furthermore be desirable to provide an editing system capable of accommodating varying numbers and types of information inputs.

It would still furthermore be advantageous to provide an editing system capable of intelligent operations at peripheral portions of such system in addition to a central portion of the system.

BRIEF DESCRIPTION OF THE INVENTION

The above and other objects are accomplished in accordance with the invention by providing an editing system capable of displaying different menus of editing information and selections on a display screen. The display screen is responsive to the touching of selected areas thereof by the operator so as to change the menus and at the same time accomplish desired editing functions. The presentation of a limited menu of editing information and selections at any given instant enables the operator to concentrate on a particular type or types of editing operations being performed. At the same time, however, considerable versatility is afforded in that the operator can choose the level at which he desires to work and can change each menu as he sees fit so as to combine levels and afford the custom designing of menus with virtually unlimited possibilities.

The versatility and character of operation of editing systems in accordance with the invention are enhanced by utilizing a system arrangement which places intelligent capabilities at peripheral locations as well as at a central location. In this manner a single central processor can communicate with a variety of different input equipment virtually simultaneously. Proper interfacing equipment provides for the conversion of data into a machine usable form tailored to the particular requirements of input and output peripheral equipment.

In a preferred arrangement of an audio/video editing system in accordance with the invention a data monitor comprising a cathode ray tube or other display screen device is coupled to an edit controller from which it receives the different menus of editing information and selections. The display screen is equipped with apparatus for providing a network of interruptable beams thereacross. When the operator points to a particular character or group of characters on the display screen, the beams in this area of the display screen are interrupted and a corresponding signal is provided to the edit controller. The edit controller which is comprised of a central processing unit, a memory and a character generator responds by making appropriate changes in the menu provided the visual display. The character generator coupled to the central processing unit provides the various characters comprising the different menus displayed on the data monitor. At the same time the central processing unit together with its associated memory provides data to other portions of the editing system to accomplish editing functions commanded when the operator touches particular portions of the displayed menus. In addition to the touch responsive data monitor, the editing system can be provided with one or more conventional keyboards also capable of providing editing information and selections to the edit controller.

The edit controller includes a plurality of intelligent line controllers coupled to the central processing unit. One of the intelligent line controllers is coupled to the touch sensitive apparatus associated with the data monitor. Another one of the intelligent line controllers is coupled to a record tape recorder on which the material being edited is recorded. Another one of the intelligent line controllers is coupled to a switcher. The remaining ones of the intelligent line controllers are each coupled to a different input information source. The input information sources can comprise such things as video cameras or audio microphones but are typically comprised of source tape recorders. The switcher is coupled between the record tape recorder and the various input sources such as the source tape recorders to control coupling of the input sources to the record tape recorder. Each of the intelligent line controllers which includes its own processing unit and memory is capable of performing intelligent functions in locations remote from the central processing unit. In addition to converting parallel data from the central processing unit to a serial data form and vice versa, each intelligent line controller acts as a data buffer between the central processing unit and the various tape recorders and other peripheral equipment. The intelligent functions performed by the intelligent line controllers enable the central processing unit to communicate with the various pieces of peripheral equipment virtually simultaneously. The result is an open-ended editing system capable of being coupled to input devices of varying numbers and types. The various input devices such as the source tape recorders as well as the switcher and the record tape recorder are coupled to the various intelligent line controllers through interfaces which serve to convert the serial data from the intelligent line controllers into a form usable by the particular recorder or other device coupled thereto.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
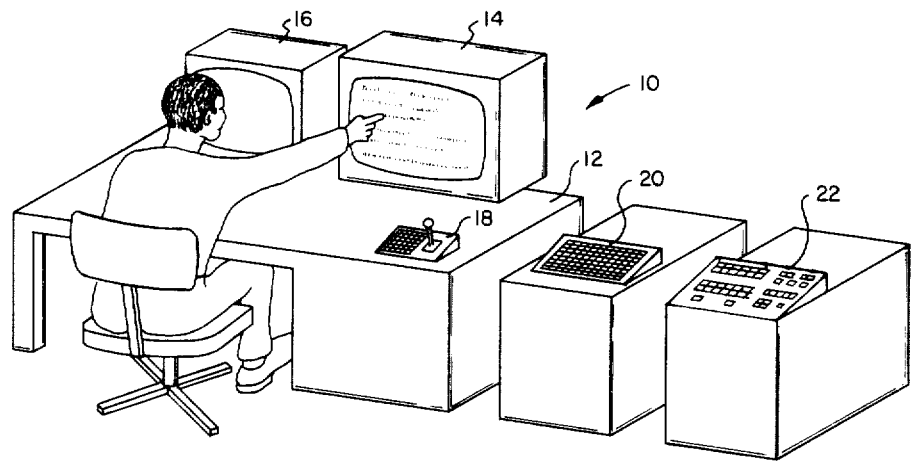
FIG. 1 is a perspective view of an audio/video editing system in accordance with the invention.

FIG. 1 depicts a video editing system 10 in accordance with the invention. The video editing system 10 is mounted on or contained within a desk 12 and includes a touchscreen data monitor 14 and a video monitor 16 mounted on the top of the desk 12. Also mounted on the top of the desk 12 is a joystick panel 18. A designated keyboard 20 or a designated keyboard 22 having keys arranged in an ASCII format, both of which are shown in FIG. 1, can also be used to provide alternative human interfaces with the system 10.

The video editing system 10 of FIG. 1 can have up to three different human interfaces which are comprised of the touchscreen data monitor 14, the designated keyboard 20 and the ASCII keyboard 22, each utilizing a joystick panel 18. The joystick panel 18 has several control buttons thereon plus a joystick. When control of a particular tape transport is obtained by one of the human interfaces 14, 20 and 22, the joystick panel 18 may be used to control the operation of that transport. The designated keyboard 20 may be of conventional design and includes all of the various keys and controls needed to perform the various editing functions used in a modern, sophisticated editing system. The ASCII keyboard 22 has the various keys thereof arranged in conventional typewriter format so that the various editing functions can be touch typed into the system 10 by the operator. The keyboards 20 and 22 comprise two different alternative ways in which the editing system 10 can be controlled by the operator. The touchscreen video monitor 16 provides a picture of the video information being recorded on a record tape recorder as editing is carried out by the operator.

Figure 2:
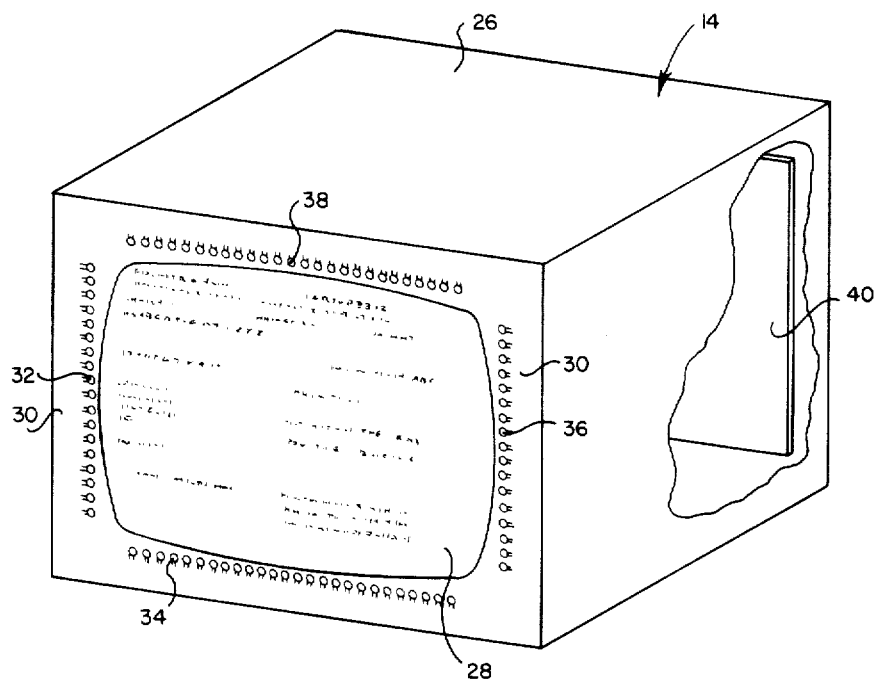
FIG. 2 is a perspective view of the data monitor of the editing system of FIG. 1 showing the touch responsive apparatus used in conjunction therewith.

In accordance with the invention a superior and highly advantageous human interface with the editing system 10 is provided by the touchscreen data monitor 14. As shown in detail in FIG. 2, the touchscreen data monitor 14 is comprised of a cathode ray tube 26 having a display screen 28 at the front thereof. Mounted adjacent the display screen 28 is a touch input system 30. The touch input system 30 establishes a pattern of interruptable beams across the face of the display screen 28 using light emitting diodes and photodetectors. In the present example the touch input system 30 is of the type manufactured by Carroll Manufacturing Company of Champaign, Ill. and includes two different pluralities of light emitting diodes 32 and 34 on the left side and bottom of the display screen 28 respectively. The touch input system 30 also includes a first plurality of photodetectors 36 on the right-hand side of the display screen 28 opposite the light emitting diodes 32 and a second plurality of photodetectors 38 along the top of the display screen 28 and opposite the light emitting diodes 34. The light emitting diodes 32 emit infrared rays which extend in generally parallel fashion across the face of the display screen 28 to the photodetectors 36. Each one of the light emitting diodes 32 corresponds with a particular one of the photodetectors 36 so that the infrared ray from the light emitting diode falls upon the photodetector. In like fashion the light emitting diodes 34 emit infrared rays which extend upwardly along the face of the display screen 28 in generally parallel fashion to the photodetectors 38.

The light emitting diodes 32 and 34 and the photodetectors 36 and 38 establish an X-Y coordinate system of beams or rays across the face of the display screen 28. When the operator touches a particular location on the display screen 28 as shown in FIG. 1, one or more of the infrared rays from the light emitting diodes 32 and 34 are interrupted. A control logic box 40 which is coupled to the photodetectors 36 and 38 responds by providing a signal representative of the particular location on the screen 28 touched by the operator. The control logic box 40 does this by determining the average Y location of the infrared rays from the light emitting diodes 32 which are broken and by determining the average X location of the infrared rays from the light emitting diodes 34 which are broken. The resulting output signal from the control logic box 40 thus represents the average X and Y position of the area on the display screen 28 touched by the operator. The control logic box 40 is of conventional design and may be designed or purchased separately or in conjunction with the light emitting diodes 32 and 34 and the photodetectors 36 and 38 as part of a complete touch input system 30.

The particular touch input system 30 shown and described is for purposes of illustration only, and it should be understood that other touch systems which are capable of providing an output signal indicating an area touched on the display screen 28 can be used. Other touch systems which can be used include a variety of different manufactured products such as those employing a conductive glass and plastic laminate, those employing acoustic waves and those in which a conductive pattern is etched on the display screen.

As will become more fully apparent from the discussion to follow, the data monitor 14 with its included touch input system 30 provides a highly versatile and advantageous human interface with the editing system 10. The editing system 10 is capable of displaying any one of a plurality of different menus of editing information and selections on the data monitor 14. The operator then chooses one or more of the editing selections by touching the characters on the display screen 28 which describe or represent such selections. Each time the display screen 28 is touched by the operator, the resulting output signal from the control logic box 40 is applied to a portion of the editing system 10 which compares such information with the characters displayed on the screen to determine the particular function selected by the operator. The system 10 then executes any required editing functions and at the same time changes the information displayed on the screen 28. Such changes may be accomplished by displaying an entirely new menu of information and selections on the monitor 14 or by simply modifying the original menu displayed. This enables the operator to concentrate on editing from the standpoint of different levels or different types of functions. Also, because the makeup of a particular displayed menu is virtually unlimited, a great amount of versatility and flexibility is introduced into the editing system 10.

Figure 3:
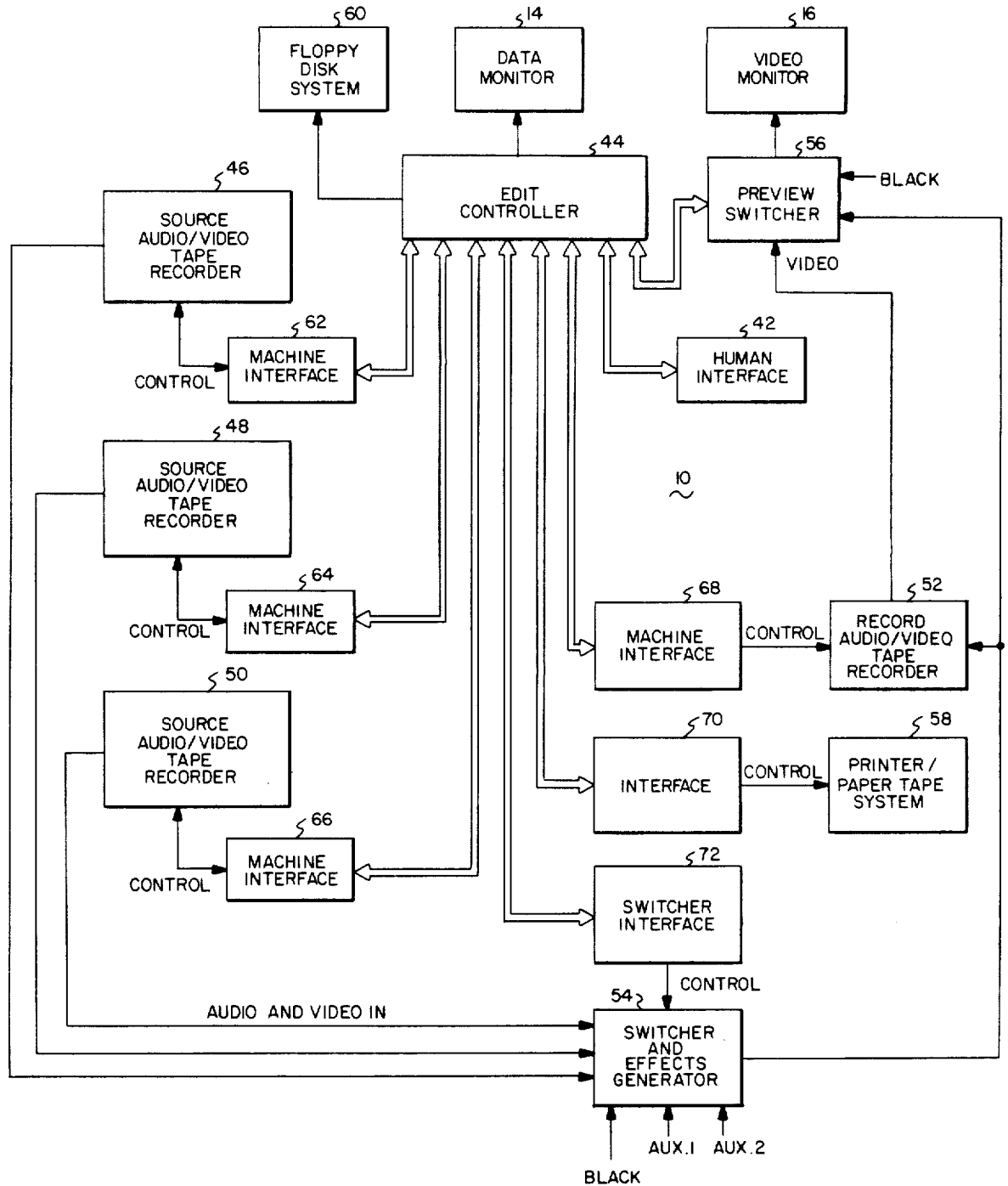
FIG. 3 is a block diagram of the editing system of FIG. 1.
Figure 4:
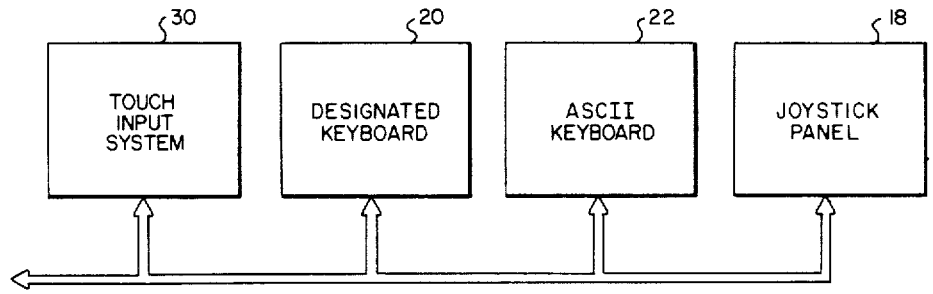
FIG. 4 is a block diagram of the human interface portion of the editing system of FIG. 3.

FIG. 3 depicts a block diagram of the editing system 10. The editing system 10 includes a human interface 42 which is shown in FIG. 4 as being comprised of the joystick panel 18 and the designated keyboard 20, the ASCII keyboard 22 and the touch input system 30. The human interface 42 is coupled to an edit controller 44 as is the touchscreen data monitor 14. Each time one of the keys or other controls on the panel 18 or the keyboards 20 and 22 is manipulated or the touch input system 30 senses the touching of an area on the display screen of the data monitor 14, a corresponding signal is provided to the edit controller 44. In addition to providing the menus of editing information and selections to the data monitor 14, the edit controller 44 controls all other portions of the editing system 10 including three different source audio/video tape recorders 46, 48 and 50, a record audio/video tape recorder 52 and a switcher and effects generator 54. Each of the source audio/video tape recorders 46, 48 and 50 provides a different audio and video input to the switcher and effects generator 54. The switcher and effects generator 54 responds to commands from the edit controller 44 to couple one or more of the audio and video signal inputs thereto to the record audio/video tape recorder 52. The video information recorded on the record audio/video tape recorder 52 is also applied to a preview switcher 56 controlled by the edit controller 44. The preview switcher 56 in turn provides the video information for display on the video monitor 16. The preview switcher 56 is required for certain types of tape recorders when used as the record audio/video tape recorder. Still other types of tape recorders eliminate the need for the preview switcher 56. The edit controller 44 is also coupled to control a printer and paper tape system 58.

A floppy disk system 60 is coupled to the edit controller 44 so as to both input data to and receive data from the edit controller 44. The floppy disk system 60 comprises one example of a mass storage medium which can be used for this purpose, with various other types of mass storage media being usable for this purpose. Initially, instructions for the various menus to be displayed on the data monitor 14 and the various editing functions which are recorded on a floppy disk are loaded from the disk system 60 into the edit controller 44. Thereafter, as editing functions are performed certain information defining the location and nature of different editing functions performed along the length of the tape within the record audio/video tape recorder 52 may be outputted by the edit controller 44 for storage in the floppy disk system 60. Alternate mass storage systems may store the information in an on-board PROM or a CCD memory.

After the menus and other information are loaded into the edit controller 44 from the floppy disk system 60, the edit controller 44 provides an initial menu of information and selections on the data monitor 14. When the operator responds by punching a key on the one of the keyboards 20 and 22 or by touching the display screen 28 of the data monitor 14, the signal is sent from the human interface 42 to the edit controller 44. The edit controller 44 identifies the edit function represented by the signal, and then, if necessary, changes the display on the data monitor 14 by either making changes in the present menu or by providing a new menu to the data monitor 14. At the same time any edit functions to be performed within the system 10 are carried out under the control of the edit controller 44. For example, where video information from one or more of the source recorders 46, 48 and 50 is to be recorded on the recorded recorder 52, the edit controller 44 controls those of the source recorders 46, 48 and 50 involved, the record recorder 52 and the switcher and effects generator 54. The processing of the various different video information is carefully synchronized using the time code or control track recorded on the various lengths of tape and which identifies the recordings on a frame-by-frame basis. The edit controller 44 continues to respond to inputs from the human interface 42 and to change the menus on the data monitor 14 and effects editing functions accordingly until all editing operations have been completed.

As previously noted the edit controller 44 controls the source recorders 46, 48 and 50, the record recorder 52 and the switcher and effects generator 54. The edit controller 44 has a choice of cuts, keys, dissolves and special effects. Cue points are selected manually to control tape speed and direction. Edit-in and edit-out points are marked manually in this mode of operation. If desired, cue points can also be selected by entering time code values for entry and exit points. Values for pre-roll and post-roll are also entered, as well as dissolve and special effect duration.

The source audio/video tape recorders 46, 48 and 50 are coupled to the edit controller 44 via machine interfaces 62, 64 and 66 respectively. The record audio/video tape recorder 52 is coupled to the edit controller 44 by a machine interface 68. The printer and paper tape system 58 is coupled to the edit controller 44 by an interface 70. The switcher and effects generator 54 is coupled to the edit controller 44 by a switcher interface 72. The various interfaces 62, 64, 66, 68, 70 and 72 serve to convert the data communicated from and to the edit controller 44 between a serial form as it appears at the output of the edit controller 44 and a form which is usable by the particular recorder or other component to which the interface is coupled. For example, one particular type of tape recorder requires a DC voltage ranging from 0 volts to +10 volts to control forward and reverse tape motion, while a different type of tape recorder requires a signal varying in frequency to control tape motion. The various interfaces perform the appropriate conversion of the data from the edit controller 44 into such forms. A typical interface is described in detail in connection with FIG. 7.

Figure 5:
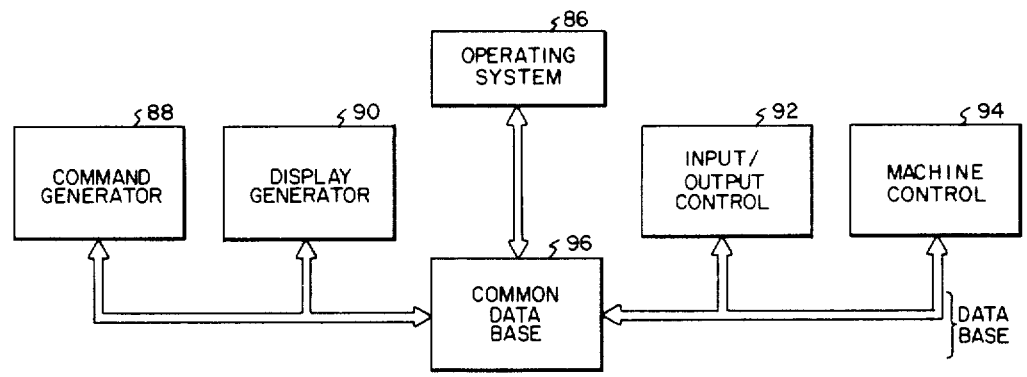
FIG. 5 is a block diagram of the different basic functions performed by the edit controller of the editing system of FIG. 3.
Figure 6:
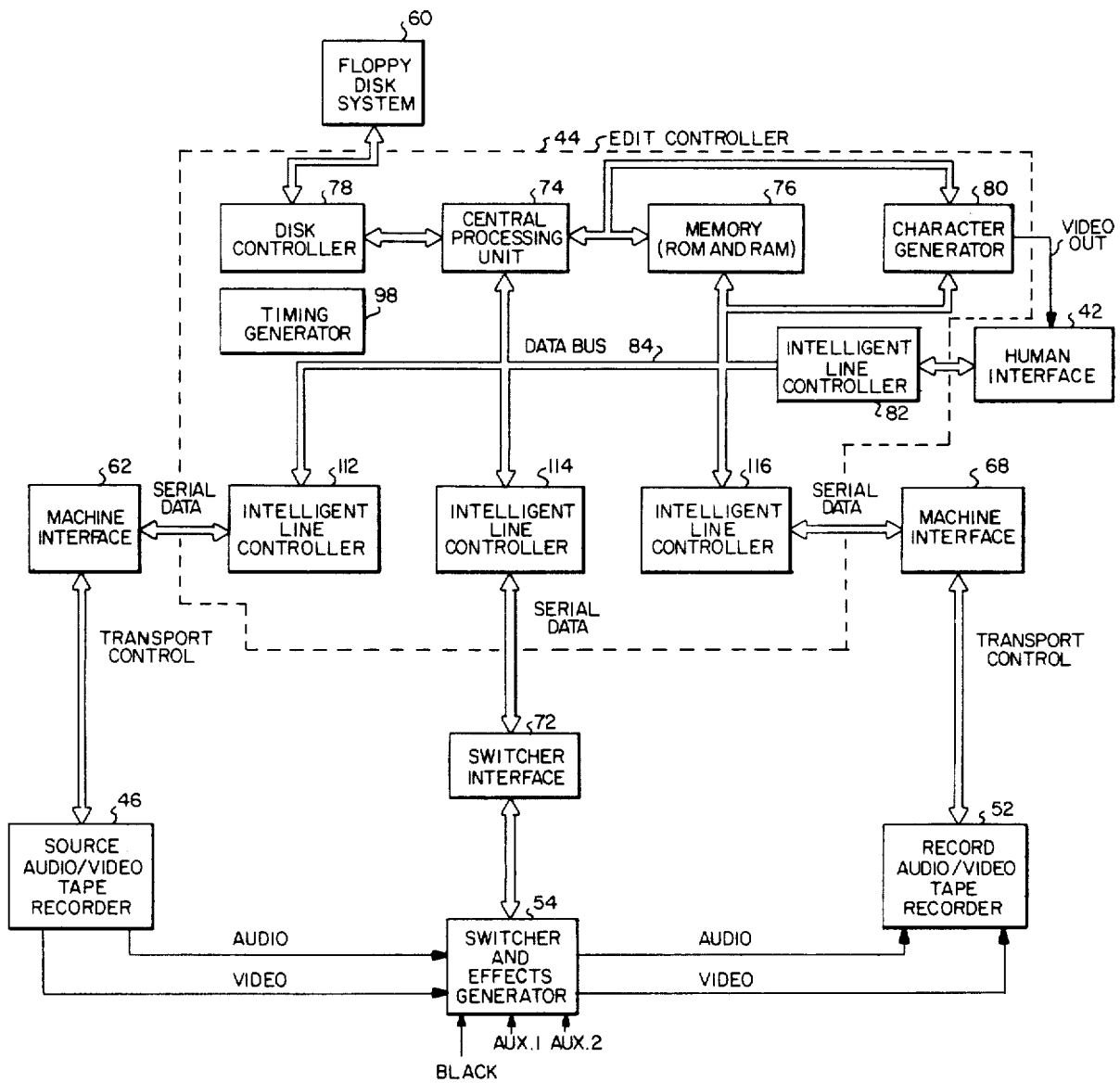
FIG. 6 is a block diagram of a portion of the editing system of FIG. 3 showing the edit controller in greater detail.

FIG. 5 depicts the basic functions performed by the edit controller 44, while FIG. 6 depicts the controller 44 in detail. Referring first to FIG. 6, it will be seen that the edit controller 44 includes a central processing unit 74 and an associated memory 76. The memory 76 includes both read only memory (ROM) portions and random access memory (RAM) portions. The central processing unit 74 is coupled to the floppy disk system 60 through a disk controller 78. The central processing unit 74 is also coupled to the human interface 42 through a character generator 80 which sends an output to the data monitor 14 representing the information being displayed on the monitor 14. When the information from the floppy disk within the floppy disk system 60 is loaded into the edit controller 44, such information is stored in the memory 76. The central processing unit 74 responds to the signals from the human interface 42 applied thereto via an intelligent line controller 82 and a data bus 84. Based on the signals communicated from the human interface 42, the central processing unit 74 performs any editing functions within the system 10 that are dictated by the signals. At the same time, the central processing unit 74 causes the menu presently being displayed on the data monitor 14 to change or a new menu to be presented if needed. This is accomplished by determining the desired characters to be displayed on the data monitor 14 from the memory 76 and providing such characters to the character generator 80. The character generator 80 which stores the various characters in a dot matrix format responds to characters outputed from the memory 76 by causing the display of the desired characters on the monitor 14.

Included in the data stored in the memory 76 from the floppy disk system 60 are overall instructions referred to as the operating system 86 in FIG. 5. The operating system 86 controls four separate processes referred to as command generator 88, display generator 90, input/output control 92 and machine control 94. The four different processes 88, 80, 92 and 94 are carried out in parallel under the control of the operating system 86. The command generator 88 responds to signals from the human interface 42 by determing what is to be done. This results in the generation of data which is entered in a common data base 96. The display generation process 90 involves the evaluation of the data entered in the common data base 96 to determine what is to be displayed on the data monitor 14. The display generator 90 provides any needed data in connection with changes in the display to the character generator 80. The input/output control process 92 provides for the control of the printer/paper tape system 58 and file system as well as any other peripheral equipment aside from the various tape recorders and switchers. The machine control process 94 responds to data entered in the common data base 96 by determining what actions are to be taken by the source tape recorders 46, 48 and 50, the record tape recorder 52 and the switchers. This results in appropriate commands being provided by the edit controller 44 to the tape recorders and switchers.

Because the editing process has become increasingly sophisticated, the efficient use of costly on-line editing time has become a major priority. Edits which are constructed and previewed on less costly off-line time, on the other hand, must have their parameters recorded for future reference, reproduction or transfer to on-line equipment. To provide for this a list of such editing decisions is stored together with all the parameters necessary to carry them out. Such information can be stored in the floppy disk system 60, in the memory 76 or in the printer and paper tape system 58 shown in FIG. 3. If an editing session is interrupted, the editing decisions and parameters can be temporarily stored in one of such locations for later reloading and completion. Once the edit construction is complete, such information can be used to preview the edit or to transfer such edits to on-line equipment.

Referring again to FIG. 6 the central processing unit 74 may be comprised of any appropriate central processing unit such as the single board central processing unit sold under the designation LSI-11 by Digital Equipment Corporation. The memory 76 preferably has a RAM capacity of 64K bytes or more. A timing generator 98 generates system timing signals for the edit controller 44. As previously discussed the touch input system 30 functions in conjunction with the touch-screen data monitor 14 to perform various functions in response to being touched by the operator. These functions include system operation, the entry of data and the changing of an edit decision. The joystick panel 18 is used in conjunction with the touch input system 30 to provide for manual transport control and edit entry/exit point selection. The joystick panel 18 can also be used in conjunction with the designated keyboard 20 or the ASCII keyboard 22. Together the keyboard 20 or 22 and the panel 18 allow the operator to enter system edit data, select menus, trim edit points, and control transport operation. The designated keyboard 20 has special purpose keys for specific system operations. All system operating functions are controlled by dedicated keys such as preview, edit, search, cue, rewind, play mark entry/mark exit, key dissolve, and set/trim entry/exit. In addition, soft keys on the designated keyboard 20 may be used by the editor to define functions which may change from edit to edit. Each such soft key can be used to control the edit controller 44 in a manner similar to the operation of the touch input system 30 to change items on a menu presented by the data monitor 14 or to change menus.

The switcher and effects generator 54 may be used to select a cut, dissolve, key or one of many different wipe patterns. The wipe patterns occur from one source to another, with selection of hard or soft edges being possible. All effects are reversible in direction. The key mode provides fade-up or fade-down of a keyed foreground into a background. The key input effectively cuts a hole in the background in the shape of the video to be keyed, such as a title or graphic. The foreground of the key fills the hole in the background. Fade durations are selectable. During all effects except keys, audio is dissolved from one source to another.

In order to understand the nature of the different menus displayed on the data monitor 14, it will be helpful to consider a particular example of an editing system 10 having both primary menus and secondary menus. The primary menus are designed to accomplish the more commonly performed editing tasks. They typically display a moderate amount of information, allowing the editor to keep track of numerous steps without changing menus while at the same time limiting the total information displayed on any one menu in order to avoid confusion and clutter. There are six primary menus which include the following:

1. System Parameters—This is the first menu to appear on the data monitor 14 after the editing system is turned on. It is used primarily as a reference point, or dispatcher, from which to select other menus for editing. General system set-up controls are typically located on this menu.

2. Edit Decision List—This menu displays a portion of the current edit decision and provides the control to modify it. Also displayed are controls for previewing edits with the switcher 54.

3. Edit Decision List Configuration—This menu is used to select the edit decision parameters. The menu lists all parameters that may be used as headings on the edit decision list and their current configuration. The menu retains multiple versions of the edit decision list headings and provides the controls to add, remove, or rearrange parameters within the edit decision listings.

4. Edit Construction—This menu comprises an active display of the particular edit under construction. It indicates and allows the operator to select in-edit and out-edit points, transports, reels, and effects. This menu can be combined with a number of secondary menus to accommodate more specific editing requirements.

5. Transport Configuration—This menu provides for selection and the display of the status of transport parameters such as logical order, intelligent line controller channel, interface type, reel number and transport status.

The secondary menus in the present example are designed for discrete, specialized editing functions and are not included in the primary menus. All secondary menus except for a numerical keypad appear as additions to the lower portion of the primary menus. The keypads cause the operator to enter numerical data such as pre-roll and post-roll duration. Transport controls for the video tape recorders provide play, rewind, fast forward, search and shuttle functions. Special effects are carried out with a variety of flexible controls. Split edit modes of audio and video may be selected from different points on the source video tapes. Controls for preview edits, cuts, dissolves, wipes, fades to or from black and key modes with programmable duration are included, as well as controls over rolls.

Figure 7:
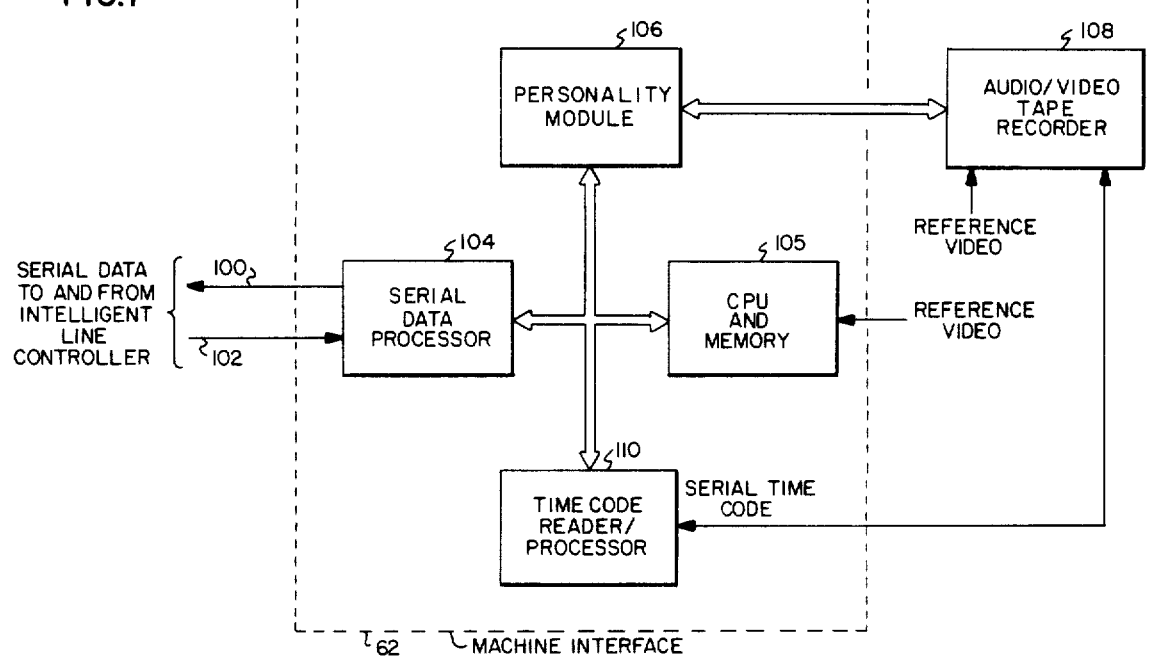
FIG. 7 is a block diagram of one of the video machine interfaces of the arrangement of FIG. 6.

FIG. 7 shows the details of a typical one of the interfaces such as the machine interfaces 62, 64, 66 and 68. As previously noted each such interface provides bidirectional communications between the controller 44 and the recorder being controlled. The input to the interface includes a pair of serial data lines 100 and 102. The line 100 provides serial data from a serial data processor 104 to the edit controller 44. Conversely, the line 102 provides serial data from the edit controller 44 to the serial data processor 104. The serial data processor 104 includes a universal asynchronous receiver transmitter which converts incoming serial data to parallel form before applying it to a CPU and Memory 105. A personality module 106 is peculiar to the particular peripheral device being interfaced such as a tape recorder 108. The personality module 106 translates the parallel data from the CPU and Memory 106 into transport commands in proper form for use by the tape recorder 108. As previously noted different peripheral devices require different types of signals. For example some tape recorders require a DC voltage to control capstan speed, while others require an AC signal whose frequency determines tape speed.

The tape recorder 108 is coupled to the CPU and Memory 105 both through the personality module 106 and a time code processor/reader 110. The connection from the tape recorder 108 to the time code processor/reader 110 provides communication for the time code track between the tape and the time code processor/reader 110. Typically, the time code track is read from the tape on the tape recorder 108 and passed to the time code processor/reader 110 where it is decoded from a serial bit stream to parallel data.

Output signals from the interface of FIG. 7 to the edit controller 44 consist of transport tally signals, status signals and time code data. Tally and status signals are buffered and then passed to the data bus 84 within the edit controller 44. Serial time code data is converted to parallel data by the time code processor/reader 110 as previously noted. This data is then communicated to the edit controller 44.

Referring again to FIG. 6 it was previously noted that the human interface 42 is coupled to the central processing unit 74 by an intelligent line controller 82. In the present example the edit controller 44 includes the intelligent line controller 82 and three additional intelligent line controllers 112, 114 and 116. The intelligent line controller 112 couples the central processing unit 74 to the machine interface 62. The intelligent line controller 114 couples the central processing unit 74 to the switcher interface 72. The intelligent line controller 116 couples the central processing unit 74 to the machine interface 68. Each of the intelligent line controllers 82, 112, 114 and 116 comprises an intelligent communications interface between the edit controller 44 and external peripheral apparatus such as the audio/video tape recorders and the human interface 42. Data from the central processing unit 74 communicated on the data bus 84 is in parallel form. Each of the controllers 82, 112, 114 and 116 converts the data to serial form before applying the data to the peripheral apparatus. Conversely, data communicated from the peripheral apparatus to the central processing unit 74 is converted from serial to parallel form by the various controllers 82, 112, 114, and 116. In addition to conversion by the data form, the various controllers 82, 112, 114, and 116 act as buffers between the peripheral apparatus and the central processing unit 74. The intelligent line controllers also verify data input formats, convert data formats and perform certain primitive controller functions such as automatic time code and status requests. The central processing unit 74 cannot communicate with two or more pieces of peripheral apparatus simultaneously. However, the effect of the presence of the various controllers is to provide for substantially simultaneous communication by receiving and holding data until the central processing unit 74 is free to receive such data.

Figure 8:
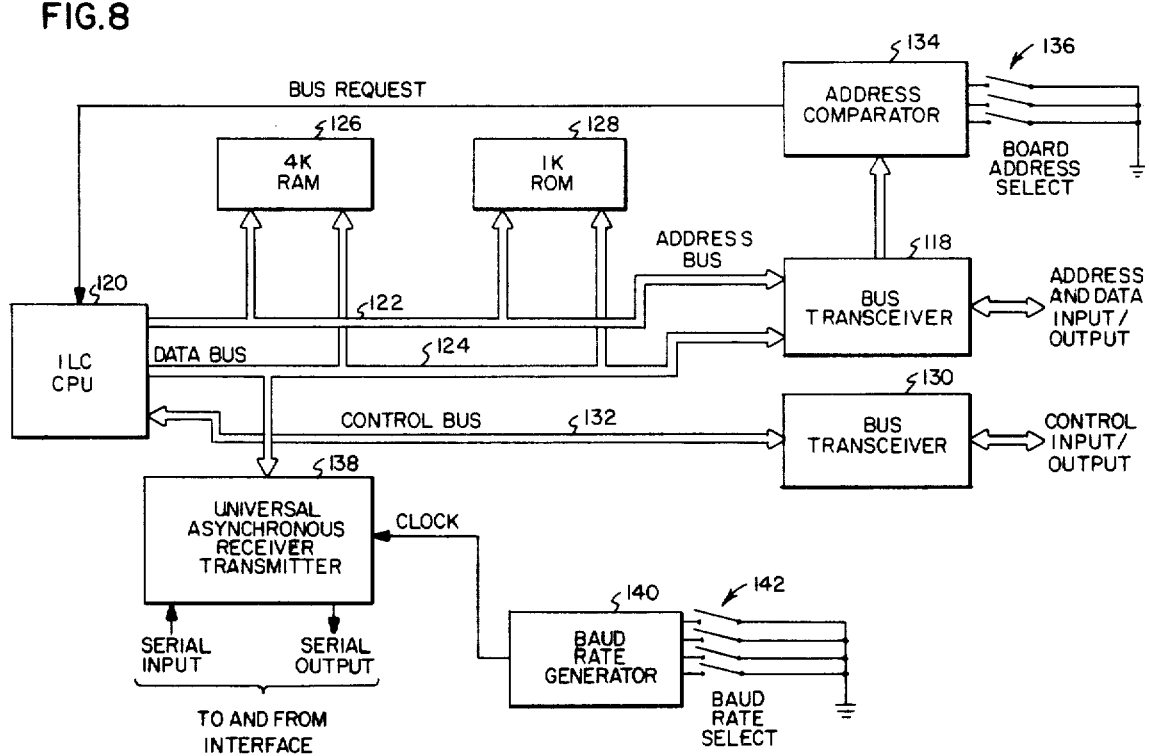
FIG. 8 is a block diagram of one of the intelligent line controllers of the arrangement of FIG. 6.

The various intelligent line controllers 82, 112, 114 and 116 are identical in construction with one of them being shown in FIG. 8. The intelligent line controller shown in FIG. 8 includes a first bus transceiver 118 coupled to the central processing unit 74 to communicate address and data between the intelligent line controller and the central processing unit 74. The bus transceiver 118 is coupled to an ILC CPU 120 by an address bus 122 and a data bus 124. The address bus 122 is also coupled to a 4K RAM 126 and to a 1K ROM 128. The data bus 124 is also coupled to the 4K RAM 126 and to the 1K ROM 128. A second bus transceiver 130 is coupled to the central processing unit 120 via a control bus 132 and to the central processing unit 74 and is operative to handle timing and control requests communicated between the intelligent line controller and the central processing unit 74.

An address comparator 134 has two different inputs, one from the bus transceiver 118 and the other from a board address select switch group 136. The address comparator 134 compares the contents of the address received from the central processing unit 74 with the setting of the board address select switch group 136. If a valid comparison is made, the comparator 134 requests control of the data and address buses 122 and 124 from the ILC CPU 120. When such control is relinquished by the intelligent line controller, data is transferred from the central processing unit 74 to the intelligent line controller RAM 126. The ILC CPU 120 in turn formats the data in the RAM 126 and then transmits the data via a universal asynchronous transmitter 138 to the interface as shown in FIG. 7. Incoming serial data from the interface is converted to parallel form by the universal synchronous receiver transmitter 138, which generates and communicates an interrupt signal to the ILC CPU 120. When the ILC CPU 120 services the interrupt signal, the incoming data is formatted and written in the RAM 126. The new data in the RAM 126 is then read by the central processing unit 74 by requesting bus control from the ILC CPU 120 and reading the data. The frequency at which the serial signals from the universal asynchronous receiver transmitter 138 are communicated to the interface is determined by a baud rate generator 140 in conjunction with a baud rate select switch group 142.

Figure 9:
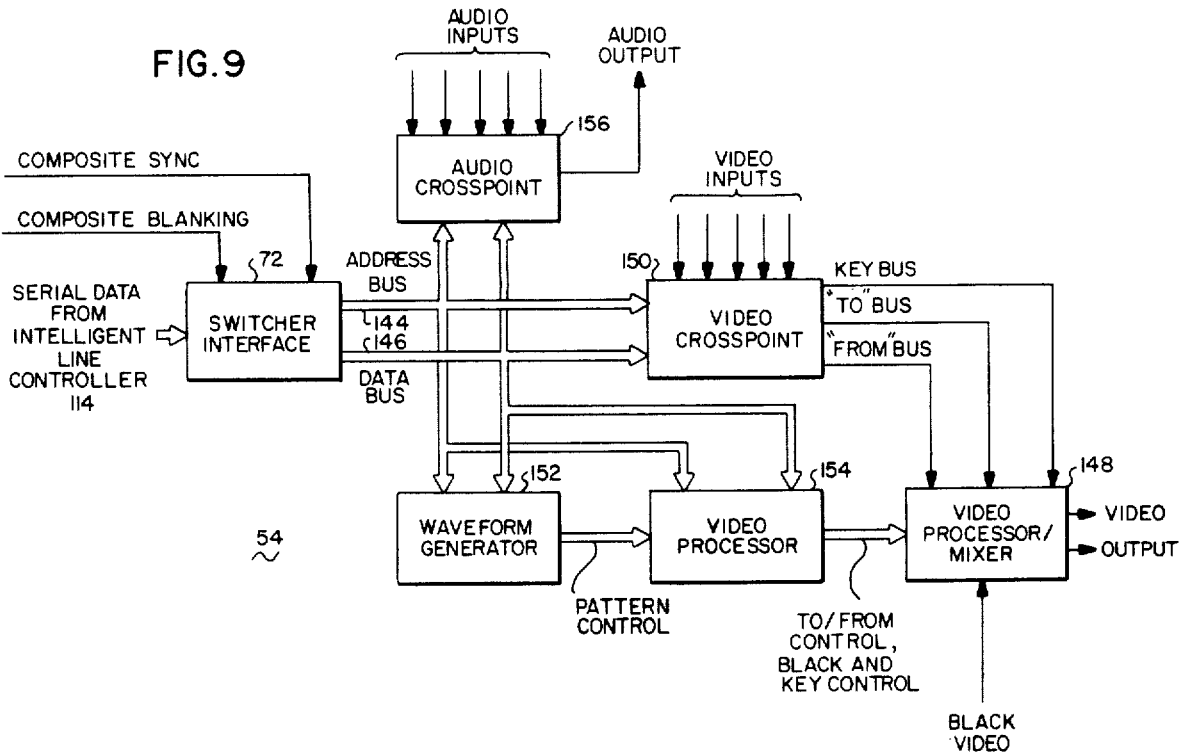
FIG. 9 is a block diagram of the switcher and effects generator of the arrangement of FIG. 6.

The switcher and effects generator 54 is shown in detail in FIG. 9. The intelligent line controller 114 associated with the switcher 54 is coupled through the switcher interface 72 to the switcher 54. The switcher interface 72 which may be of like construction to that shown in FIG. 7 is coupled to receive composite sync and composite blanking signals. The switcher interface 72 has an address bus 144 and a data bus 146 at the output thereof. The buses 144 and 146 are coupled to a video processor/mixer 148 at the output of the switcher 54 by either a video crosspoint circuit 150 or a waveform generator 152 and a video processor 154. The buses 144 and 146 are also coupled to an audio crosspoint circuit 156.

The switcher and effects generator 54 is used principally for mixing and wiping operations. In the case of a mixing operation one of the inputs to the audio crosspoint circuit 56 and one of the inputs to the video crosspoint circuit 150 are applied to the video processor/mixer 148. The video processor 154 is also used in such operation. A wiping operation is performed using the waveform generator 152 and the video processor 154.

Figure 10:
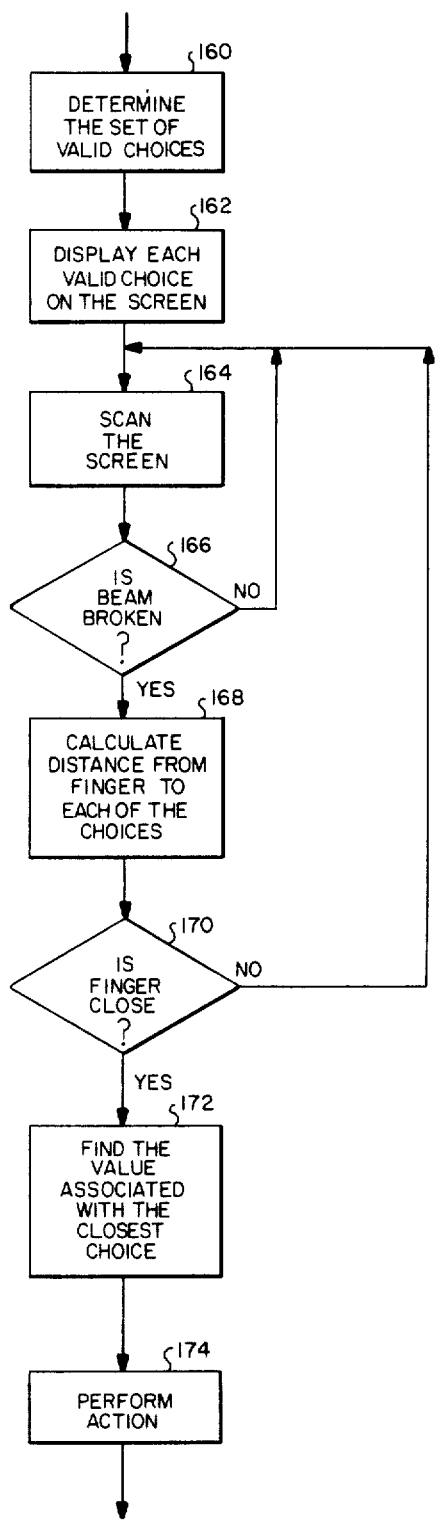
FIG. 10 is a flow chart showing the manner in which the editing system uses the data monitor and touch responsive apparatus to convert user decisions into editing actions.

FIG. 10 is a flow chart depicting the manner in which the editing system 10 uses the data monitor 14 together with the touch input system 30 to convert decisions by the operator into editing actions.

In a step 160 depicted in FIG. 10, the system 10 creates via the edit controller 44 a list of valid choices to be presented to the operator. At different points in an editing process, a different set of operator requests is considered valid. The edit controller 44 first determines this set of choices in the step 160. Usually, this is a function of the type of action currently being performed. In addition, the edit controller 44 may have to examine information received from other transports or sources as well as information previously stored in the memory 76.

In a next step 162, each valid choice is displayed on the screen 28 of the data monitor 14. Associated with each choice in the set of valid choices are several important pieces of information. One of these is a description of where on the screen 28 the choice should be presented to the operator. An additional piece of information is what label should be printed on the screen 28 so that the operator is able to identify and understand the choice. Once a valid set of choices has been assembled, each label is displayed at its corresponding position on screen 28. The operator is thus made aware of what the current set of choices consists of and is expected to now select one of them.

In a next step 164, the screen 28 of the data monitor 14 is scanned and a decision 166 is made as to whether or not a beam has been broken. When the operator has determined which of the labels displayed on the screen 28 corresponds to the action he wants the editing system 10 to take, he places a finger (or other object) on that label on the screen 28. As previously noted, the light emitting diodes 32 and 34 mounted adjacent the screen 28 emit infra-red beams which are directed onto corresponding ones of the photodetectors 36 and 38. Placement of the operator's finger at a particular location on the screen 28 results in one or more of the photodetectors 36 sensing interruption of the infrared beams normally received thereby. By periodically examining the outputs of the photodetectors 36 and 38, the editing system detects the presence of a finger. By assigning numeric values to the various photodetectors 36 and 38, the editing system can also calculate numbers which represent the horizontal and vertical coordinates of the finger on the screen 28. As a result of the periodic examination of the outputs of the photodetectors 36 and 38, the decision 166 indicates whether or not one or more of the infrared beams have been broken.

If the decision 166 is that one or more of the infrared beams have been broken, then in a next step 168 the distance from the finger to each of the choices displayed on the screen 28 is calculated. It was previously noted that each choice displayed on the screen 28 has associated with it an indication of a position on the screen where it is displayed. Each element in a set of choices is examined and the distance between the position associated with that choice and the position of the finger is calculated. The choice which has the smallest distance from the position of the finger is assumed to be the one intended by the operator. If the finger is too far away from the nearest choice, no action is taken. These actions are represented by a decision 170 shown in FIG. 10.

If the decision 170 results in a "yes" determination indicating that the finger has been placed at least within a nominal distance of one of the choices and that choice has been determined to be the one desired by the operator, the value associated with that choice is computed in a following step 172. Associated with each choice in a set of determined choices is a value. During the step 172 the value associated with the choice selected by the operator is determined. Using this value, the editing system 10 performs the desired action which is depicted in a following step 174 in FIG. 10. The value determined in the step 172 corresponds to the type of signal provided when either the designated keyboard 30 or the ASCII keyboard 22 is utilized.

The various operations depicted in the flow charts of FIG. 10 can be better understood by considering an example. If it is assumed that at a particular point in an editing session the operator is expected to enter a digit between 0 and 9, then under these conditions there are ten possible choices. Associated with each of the choices is a position on the screen 28 of the data monitor 14. Each choice has a label printed on the screen 28 so that the numerals "1", "2", "3", etc., are displayed on the screen. If the operator wants to select the numeral "7", he places a finger on the screen 28 at the place where the label "7" has been displayed. The infrared beams corresponding to this location are broken and the editing system determines the horizontal and vertical coordinates of the finger. Each of the ten possible choices is examined, and the distance between its position on the screen 28 and the position of the finger on the screen 28 is calculated. In the present example, the choice corresponding to the numeral "7" is determined to be the closest. Associated with each choice is a value. In the present example, the value for "7" might be the ASCII code for "7". This is the value which most computer and communication equipment uses to represent a key labeled "7". The editing system 10 now uses this value as if it had come from a conventional keyboard or communication device such as the designated keyboard 20 or the ASCII keyboard 22.

While the invention has been particularly shown and described with reference to a preferred embodiment thereof, it will be understood by those skilled in the art that various changes in form and details may be made therein without departing from the spirit and scope of the invention.

What is claimed is:

1. An audio/video editing system comprising:
    at least one source recorder device for supplying a source of audio/video information;
    a recording recorder device for recording selected audio/video information from the at least one source recorder device;
    a switcher device for selectively coupling the at least one source recorder device and the recording recorder device;
    computer means for providing selected edit commands;
    an operator controlled input device including edit function display/indicating means for supplying serial edit function messages indicative of selected editing functions to be performed by the recorder device and the switcher device;
    an operator intelligent line controller coupled to the operator controlled input device for identifying, converting and buffering the serial edit function messages in response to the computer means edit commands to provide corresponding parallel edit commands;
    a plurality of device intelligent line controllers coupled to the operator intelligent line controller for establishing communication with the respective recorder and switcher devices, and for converting and buffering the parallel edit commands to define serial edit commands, in response to the computer means;
    a plurality of interfaces coupled between respective device intelligent line controllers and respective recorder devices and switcher device for translating the serial edit commands to a form commensurate with the requirements of the respective devices, and for translating device edit status messages from the respective devices for return to respective device intelligent line controllers, in response to the computer means; and
    said device line controllers further converting and buffering the returned device edit status messages in response to the computer means.

2. The system of claim 1 wherein the display/indicating means include a cathode ray tube having a display screen, and indicating means responsive to the touching of a particular portion of the display screen by an operator for providing to the computer means a corresponding indication of selected ones of the editing functions to be performed.

3. The system of claim 2 wherein the indicating means include means for selecting a menu of selected editing functions for display on the display screen in response to the editing information displayed at a specific location of the display screen touched by the operator.

4. The system of claim 1 wherein each of the controllers is operative to convert data between parallel and serial forms to allow selectively spacing the operator controlled input device and the recorder and switcher devices from the respective controllers and from the computer means.

5. The system of claim 1 wherein the operator controlled input device further includes at least one keyboard having a plurality of keys thereof representing the selected editing functions.

6. The system of claim 1 wherein the operator controlled input device further includes at least one joystick panel and control keys for supplying additional serial edit function messages indicative of additional editing functions.

7. The system of claim 1 wherein the interfaces include:
- a first interface coupled to the at least one source receiver device;
- a second interface coupled to the recording recorder device;
- a third interface coupled to the switcher device; and
- wherein each of the interfaces include an interface serial data processor and a data conversion module responsive to the processor for converting data between the serial form and the specific device usable forms required by the respective devices.

8. The system of claim 7 wherein the serial data processors of each interface are coupled to the respective controllers, a time code processor is coupled to the serial data processor, and the data conversion module is coupled from the serial data processor to the respective recorder device and switcher device.

9. The system of claim 7 wherein the device intelligent line controllers include:
- a first, second and third controller coupling the respective first, second and third interfaces to the operator intelligent line controller and to the computer means; and
- the controllers each being operative to convert the data from the serial to parallel format, and vice versa, and to store the parallel data under command of the computer means.

10. The system of claim 9 wherein the controllers each include a central processing unit, a transceiver coupling the central processing unit to the computer means, a memory coupled to the central processing unit and to the transceiver, and an address comparator coupled between the transceiver and the central processing unit.

11. The system of claim 10 further including a receiver transmitter coupled from the central processing unit to the respective interface and operative to convert data between parallel and serial form.

12. An audio/video editing system comprising:
- at least one source recorder device for supplying a source of audio/video information to be edited;
- a recording recorder device for recording selected edited audio/video information from the at least one source recorder device;
- a switcher device for selectively coupling the at least one source recorder device and the recording recorder device;
- computer means for providing selected edit commands;
- an operator controlled input device including edit function display/indicating means for supplying serial edit function messages indicative of selected editing functions to be performed by the recorder devices and the switcher device;
- an operator intelligent line controller coupled to the operator controlled input device and responsive to the computer means for converting the serial edit function messages to a selected and parallel form and for buffering the messages for subsequent use as parallel edit function messages;
- interfaces coupled to respective recorder devices and switcher devices for translating commands to a selected form commensurate with the requirements of the respective devices and for returning serial device edit status messages indicative of the status of the respective devices; and
- device intelligent line controllers coupling the operator intelligent line controller with the interfaces and responsive to the computer means for establishing communication with the recorder and switcher devices via the respective interfaces, for converting the computer means edit commands to serial edit commands and the serial device edit status messages back to parallel device edit status messages, and for buffering the commands and messages in response to the computer means.

* * * * *